(12) United States Patent
Park et al.

(10) Patent No.: US 9,376,151 B2
(45) Date of Patent: Jun. 28, 2016

(54) WALKING ROBOT AND CONTROL METHOD THEREOF

(75) Inventors: Jae Ho Park, Suwon-si (KR); Kyung Shik Roh, Seongnam-si (KR); Woong Kwon, Seongnam-si (KR); Joo Hyung Kim, Seongnam-si (KR); Ju Suk Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1053 days.

(21) Appl. No.: 13/293,465

(22) Filed: Nov. 10, 2011

(65) Prior Publication Data

US 2012/0165983 A1    Jun. 28, 2012

(30) Foreign Application Priority Data

Dec. 22, 2010  (KR) .......................... 10-2010-0132595

(51) Int. Cl.
*B25J 9/18* (2006.01)
*B62D 57/032* (2006.01)
*B25J 9/16* (2006.01)

(52) U.S. Cl.
CPC ............... *B62D 57/032* (2013.01); *B25J 9/162* (2013.01); *B25J 9/1664* (2013.01); *G05B 2219/40244* (2013.01)

(58) Field of Classification Search
CPC .................................................... B62D 57/032
USPC ........ 701/245, 261; 180/8.1, 8.6; 318/568.11, 318/568.12
See application file for complete search history.

(56) References Cited

U.S. PATENT DOCUMENTS

| | | | |
|---|---|---|---|
| 6,289,265 B1 * | 9/2001 | Takenaka et al. | 700/245 |
| 6,992,457 B2 * | 1/2006 | Furuta et al. | 318/568.12 |
| 7,266,424 B2 * | 9/2007 | Lee et al. | 700/245 |
| 7,402,142 B2 * | 7/2008 | Kawai et al. | 600/587 |
| 7,482,775 B2 * | 1/2009 | Zaier | 318/568.12 |
| 7,530,410 B2 * | 5/2009 | Takenaka et al. | 180/8.1 |
| 8,532,824 B2 * | 9/2013 | Orita | 700/260 |
| 2007/0162152 A1 * | 7/2007 | Herr et al. | 623/24 |
| 2010/0168917 A1 * | 7/2010 | Roh | 700/258 |
| 2010/0324699 A1 * | 12/2010 | Herr et al. | 623/27 |

OTHER PUBLICATIONS

D. Hobbelen, T. de Boer, and M. Wisse, "System overview of bipedal robots Flame and TUlip: tailor-made for Limit Cycle Walking," In Proc. IEEE/RSJ International Conference on Intelligent Robots and Systems, Nice, France, 2008, pp. 2486-2491.*

* cited by examiner

*Primary Examiner* — Thomas G Black
*Assistant Examiner* — Peter D Nolan
(74) *Attorney, Agent, or Firm* — Harness, Dickey & Pierce, PLC

(57) ABSTRACT

A walking robot and a control method thereof. The control method includes performing transition of a second leg to a toe-off state, when ground reaction force applied to a first leg exceeds a first set value under the condition that the first leg is in a swing state and the second leg is in a support state, performing transition of the second leg to the swing state and transition of the first leg to the support state, when ground reaction force applied to the second leg is below a second set value under the condition that the second leg is in the toe-off state, and achieving walking of the walking robot by repeating the transitions among the swing state, the support state and the toe-off state. Thereby, the control method allows the robot to more stably and naturally walk.

17 Claims, 5 Drawing Sheets

WALKING ROBOT AND CONTROL METHOD THEREOF

CROSS-REFERENCE TO RELATED APPLICATIONS

This application claims the benefit of Korean Patent Application No. 10-2010-0132595, filed on Dec. 22, 2010, in the Korean Intellectual Property Office, the disclosure of which is incorporated herein by reference.

BACKGROUND

1. Field

Embodiments relate to a walking robot and a control method thereof.

2. Description of the Related Art

If a walking robot encounters a rough plane, an inclined plane such as a stairway, or an obstacle during walking, the walking robot has higher mobility than a robot with wheels. Particularly, since the walking robot may lose balance and thus fall down, consideration of stability of the robot when a walking pattern of the robot is set is essential.

In order to assure dynamic stability of the walking robot, research on generation of a walking pattern in consideration of a Zero Moment Point (ZMP) has been proposed.

The ZMP means a point where the sum total of moments due to force generated from the sole of a foot becomes zero. That is, the ZMP is a point where reaction between a foot of a walking robot and the ground on a contact plane therebetween becomes zero. Further, if the ZMP is present in a support region where the foot contacts the ground, the walking robot may walk without falling down.

When a behavior pattern of the walking robot is generated, if the ZMP is present in the contact plane between the sole of the foot and the ground every step, the walking robot may walk stably.

In most of recent methods to keep the walking robot balanced, a strategy as to movement of joints so that the ZMP is located in the support plane is established, and an optimization problem to satisfy constraint expressions is solved.

SUMMARY

Therefore, it is an aspect of an embodiment to provide a walking robot which more stably and naturally walks, and a control method thereof.

Additional aspects of embodiments will be set forth in part in the description which follows and, in part, will be obvious from the description, or may be learned by practice of embodiments.

In accordance with an aspect of an embodiment, a control method of a walking robot includes performing transition of a second leg to a toe-off state, when ground reaction force applied to a first leg exceeds a first set value under the condition that the first leg is in a swing state and the second leg is in a support state, performing transition of the second leg to the swing state and transition of the first leg to the support state, when ground reaction force applied to the second leg is below a second set value under the condition that the second leg is in the toe-off state, and achieving walking of the walking robot by repeating the transitions among the swing state, the support state and the toe-off state.

In the control method, torque $\tau_d(t)$ in the transition to the toe-off state may be defined by Expression 1, $$\tau_d(t) = K'_p(\theta_d(t) - \theta(t)) - K'_d \dot{\theta}(t) + \tau_{ff}(t), \ (i.e., K'_d \theta(t) \to K'_d \dot{\theta}(t)) \quad \text{Expression 1}$$

in Expression 1, $K'_p$ and $K'_d$ are gains, and $\tau_{ff}(t)$ is feed forward torque $$(i.e., K'_d \theta \to K'_d).$$

In the control method, the gains $K'_p$ and $K'_d$ may be reduced in the transition to the toe-off state.

In the control method, the gains $K'_p$ and $K'_d$ may be reduced to less than 1~10% of gains in the transition to the support state or the swing state.

In the control method, as the feed forward torque applied to the leg in the toe-off state, the feed forward torque in the counterclockwise direction may be applied to a hip joint of the leg and the feed forward torque in the clockwise direction may be respectively applied to a knee joint and an ankle joint of the leg.

In accordance with another aspect of an embodiment, a control method of a walking robot includes performing transition of a first leg to a swing state and transition of a second leg to a support state, performing transition of the second leg to a toe-off state, when ground reaction force applied to the first leg exceeds a first set value, performing transition of the second leg to the swing state and transition of the first leg to the support state, when ground reaction force applied to the second leg is below a second set value, performing transition of the first leg to the toe-off state, when ground reaction force applied to the second leg exceeds the first set value, performing transition of the first leg to the swing state, when ground reaction force applied to the first leg is below the second set value, and achieving walking of the walking robot by repeating the transitions among these states.

In the control method, torque $\tau_d(t)$ applied in the transition to the toe-off state may be defined by Expression 1, $$\tau_d(t) = K'_p(\theta_d(t) - \theta(t)) - K'_d \dot{\theta}(t) + \tau_{ff}(t), \ (i.e., K'_d \theta(t) \to K'_d \dot{\theta}(t)) \quad \text{Expression 1}$$

in Expression 1, $K'_p$ and $K'_d$ may be gains, and $\tau_{ff}(t)$ may be feed forward torque $$(i.e., K'_d \theta \to K'_d).$$

In the control method, the gains $K'_p$ and $K'_d \theta$ may be reduced in the transition to the toe-off state.

In the control method, the gains $K'_p$ and $K'_d$ may be reduced to less than 1~10% of gains in the transition to the support state or the swing state.

In the control method, as the feed forward torque applied to the leg in the toe-off state, the feed forward torque in the counterclockwise direction may be applied to a hip joint of the leg in the toe-off state and the feed forward torque in the clockwise direction may be respectively applied to a knee joint and an ankle joint of the leg in the toe-off state.

In accordance with another aspect of an embodiment, a control method of a walking robot includes performing transition of a second leg in a support state to a toe-off state, when ground reaction force applied to a first leg in a swing state exceeds a first set value, and performing transition of the second leg to the swing state and transition of the first leg to the support state, when ground reaction force applied to the second leg in the toe-off state is below a second set value.

In the control method, torque $\tau_d(t)$ applied in the transition to the toe-off state may be defined by Expression 1, $$\tau_d(t) = K'_p(\theta_d(t) - \theta(t)) - K'_d \dot{\theta}(t) + \tau_{ff}(t), \ (i.e., K'_d \theta(t) \to K'_d \dot{\theta}(t)) \quad \text{Expression 1}$$

in Expression 1, $K'_p$ and $K'_d$ may be gains, and $\tau_{ff}(t)$ may be feed forward torque $$(i.e., K'_d \theta \to K'_d).$$

In the control method, the gains $K'_p$ and $K'_d$ may be reduced in the transition to the toe-off state.

In the control method, the gains $K'_p$ and $K'_d$ may be reduced to less than 1~10% of gains in the transition to the support state or the swing state.

In the control method, as the feed forward torque applied to the leg in the toe-off state, the feed forward torque in the counterclockwise direction may be applied to a hip joint of the leg in the toe-off state and the feed forward torque in the clockwise direction may be respectively applied to a knee joint and an ankle joint of the leg in the toe-off state.

In accordance with a further aspect of an embodiment, a walking robot includes a first leg, a second leg, a sensor unit to detect ground reaction forces respectively applied to the first leg and the second leg, and a control unit to perform transition of the second leg in a support state to a toe-off state, when ground reaction force applied to the first leg in a swing state exceeds a first set value, and to perform transition of the second leg to the swing state and transition of the first leg to the support state, when ground reaction force applied to the second leg in the toe-off state is below a second set value.

In the walking robot, the control unit may apply torque $\tau_d(t)$ defined by Expression 1 to the leg in the toe-off state, $$\tau_d(t) = K'_p(\theta_d(t) - \theta(t)) - K'_d d\dot{\theta}(t) + \tau_{ff}(t), \text{ (i.e.,}$$
$$K'_d\theta \rightarrow K'_d\dot{\theta}(t))$$

Expression 1 in Expression 1, $K'_p$ and $K'_d$ may be gains, and $\tau_{ff}(t)$ may be feed forward torque $$(i.e., K'_d\theta \rightarrow K'_d).$$

In the walking robot, the control unit may reduce the gains $K'_p$ and $K'_d$ in the transition to the toe-off state.

In the walking robot, the control unit may reduce the gains $K'_p$ and $K'_d$ to less than 1~10% of gains in the transition to the support state or the swing state.

In the walking robot, the control unit may apply the feed forward torque in the counterclockwise direction to a hip joint of the leg in the toe-off state and respectively apply the feed forward torque in the clockwise direction to a knee joint and an ankle joint of the leg in the toe-off state.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
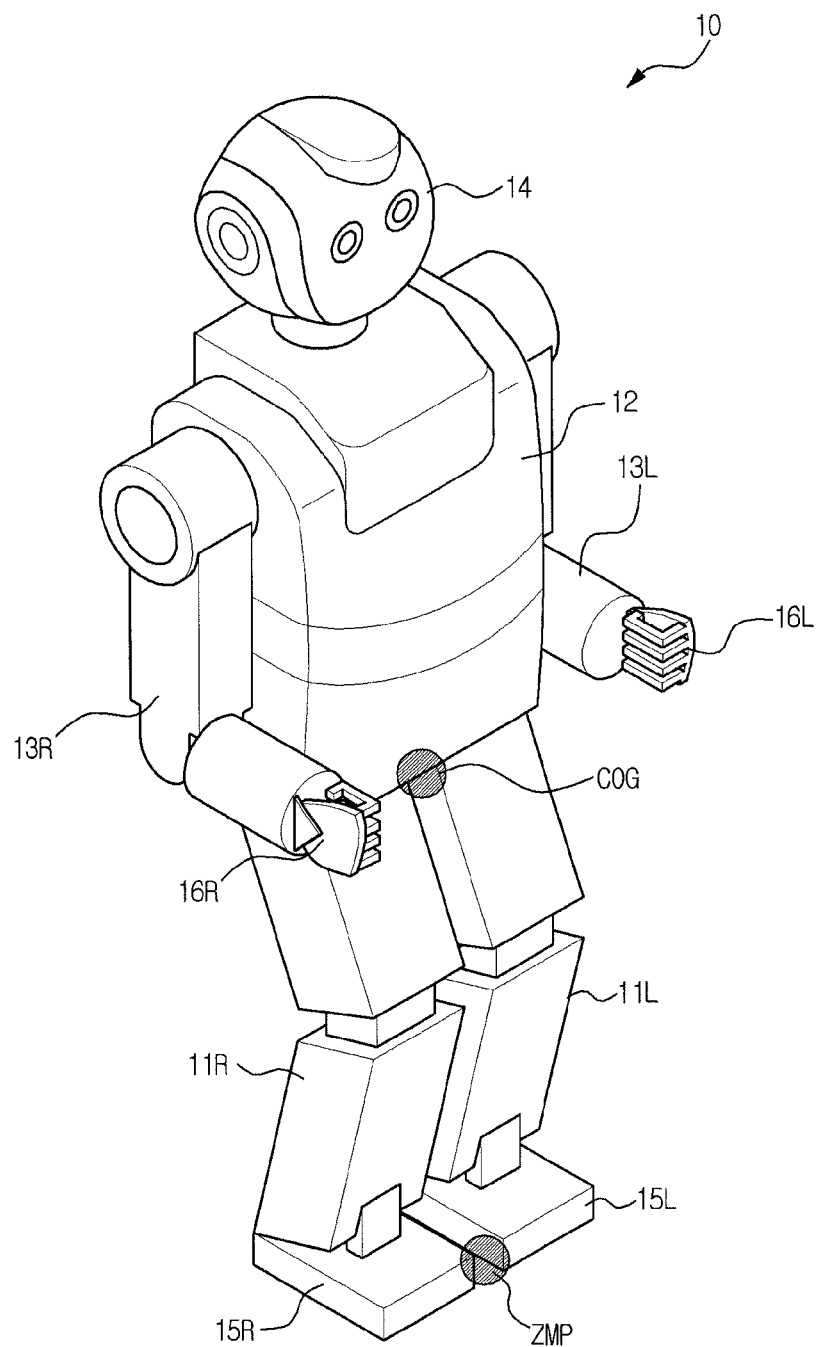
FIG. 1 is a view illustrating a walking robot in accordance with an embodiment.

Reference will now be made in detail to embodiments, examples of which are illustrated in the accompanying drawings, wherein like reference numerals refer to like elements throughout.

FIG. 1 is a view illustrating a walking robot in accordance with an embodiment. As shown in FIG. 1, a walking robot 10 is a bipedal walking robot, which walks erect with two legs 11R and 11L in the same manner as a human, and includes a torso 12, two arms 13R and 13L and a head 14 provided at the upper portion of the torso 12, and feet 15R and 15L and hands 16R and 16L respectively provided at the tips of the two legs 11R and 11L and the two arms 13R and 13L. Here, "R" and "L" respectively indicate the right and left sides of the walking robot 10, "COG" indicates the center of gravity of the walking robot 10, and "ZMP" indicates a point on a contact plane between the walking robot 10 and the ground, where moments in the roll direction (the x-axis direction, i.e., in a walking direction of the walking robot 10) and in the pitch direction (the y-axis direction, i.e., in a stride width direction of the walking robot 10) become zero.

Figure 2:
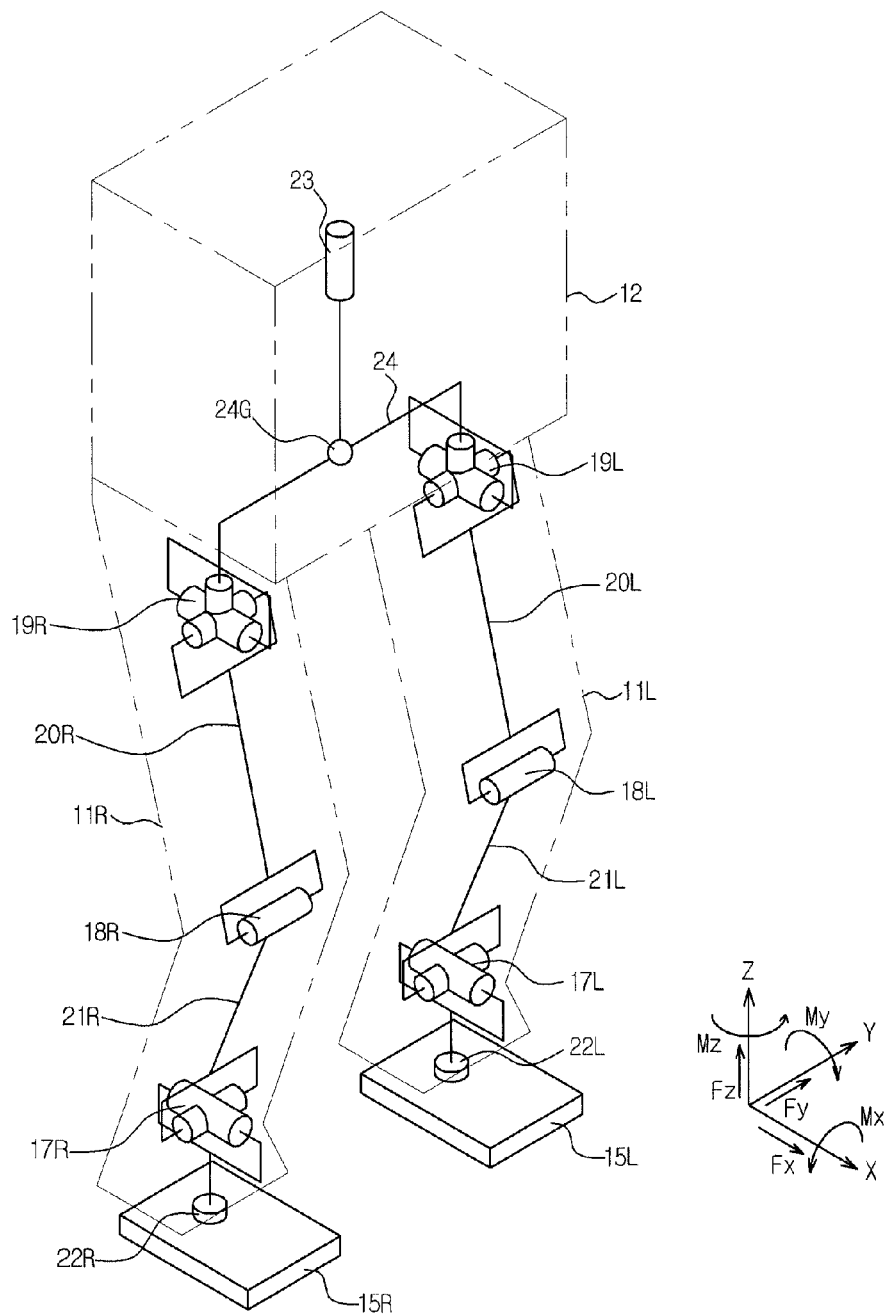
FIG. 2 is a view illustrating main joint structures of the walking robot shown in FIG. 1.

FIG. 2 is a view illustrating main joint structures of the walking robot shown in FIG. 1. As shown in FIG. 2, the two legs 11L and 11R respectively include ankle joints 17R and 17L, knee joints 18R and 18L and hip joints 19R and 19L so that portions of the walking robot 10 corresponding to ankles, knees and hips are rotatable, and the hip joints 19R and 19L are located at both sides of the lower portion of the torso 12, to which the two legs 11R and 11L are connected.

The ankle joints 17R and 17L of the respective legs 11R and 11L are movable in the x-axis direction (in the roll axis direction, i.e., in the walking direction of the walking robot) and in the y-axis direction (in the pitch axis direction, i.e., in the stride width direction of the walking robot), the knee joints 18R and 18L are movable in the y-axis direction (in the pitch axis direction), and the hip joints 19R and 19L are movable in the x-axis direction (in the roll axis direction), in the y-axis direction (in the pitch axis direction) and in the z-axis direction (in the yaw axis direction).

Further, the two legs 11L and 11R respectively include upper links 20R and 20L connecting the hip joints 19R and 19L and the knee joints 18R and 18L and lower links 21R and 21L connecting the knee joints 18R and 18L and the ankle joints 17R and 17L, thereby allowing the walking robot 10 to walk with designated degrees of freedom of the respective joints 17R, 17L, 18R, 18L, 19R and 19L according to movement of the respective joints 17R, 17L, 18R, 18L, 19R and 19L. Force and torque (F/T) sensors 22 are respectively installed at the ankles of the respective legs 11R and 11L. The F/T sensors 22 measure three-directional components Fx, Fy, and Fz of force and three-directional components Mx, My, and Mz of moment transmitted from the feet 15R and 15L and then provide ZMP data.

A waist joint 23 to rotate a portion of the walking robot 10 corresponding to a waist is provided on the torso 12 to which the two legs 11R and 11L are connected. The waist joint 23 is located coaxially with a central point 24G of a hip link 24 connecting the hip joints 19R and 19L located at both sides of the lower portion of the torso 12. Although not shown in the drawings, the respective joints 17R, 17L, 18R, 18L, 19R and 19L of the walking robot 10 include actuators (for example, electric devices such as motors) to drive the respective joints 17R, 17L, 18R, 18L, 19R and 19L.

Figure 3:
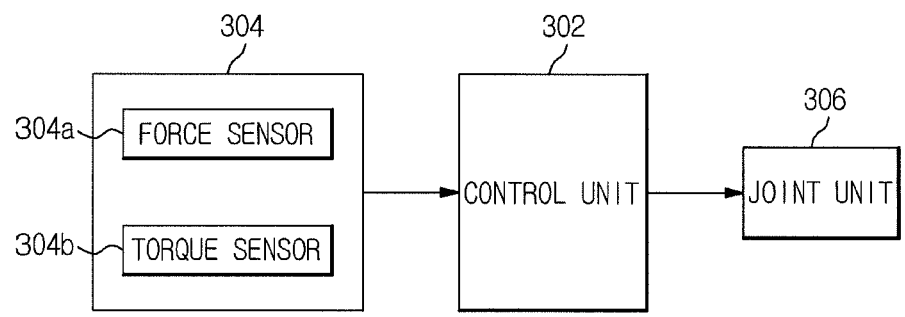
FIG. 3 is a block diagram illustrating a control system of the walking robot in accordance with an embodiment.

FIG. 3 is a block diagram illustrating a control system of the walking robot in accordance with an embodiment. As shown in FIG. 3, a sensor unit 304 including a force sensor 304a and a torque sensor 304b is communicably connected to the input side of a control unit 302 to control the overall operation of the walking robot 10, and a joint unit 306 including the respective joints of the walking robot 10 is communicably connected to the output side of the control unit 302. The sensor unit 304 measures forces applied to the respective joints or torques at the respective joints, and measures pose data of the walking robot 10. Further, the force sensor 304a and the torque sensor 304b are used to measure ground reaction forces applied to the soles of the feet of the walking robot 10. The control unit 302 controls the respective joints based on a measurement result obtained by the sensor unit 304, thereby controlling walking and other motions of the walking robot 10.

Figure 4:
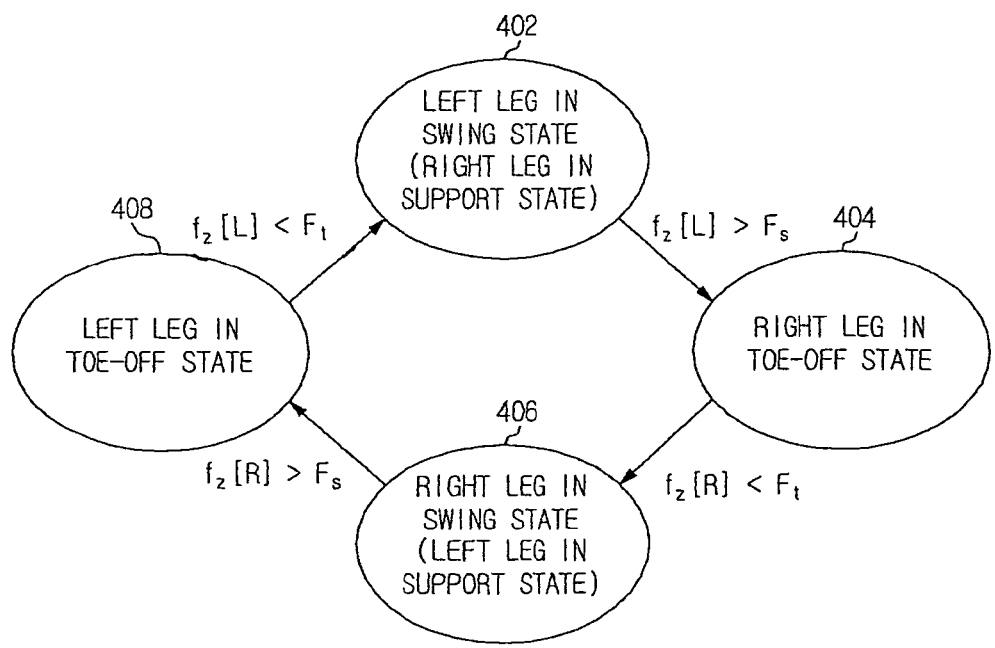
FIG. 4 is a view illustrating a walking concept of the walking robot in accordance with an embodiment.

FIG. 4 is a view illustrating a walking concept of the walking robot in accordance with an embodiment. As shown in FIG. 4, in a Finite State Machine (FSM)-based control method, a toe-off state of a support leg is added during state transition between the support leg and a swing leg, thereby allowing the robot to more naturally and stably walk.

That is, under a state in which the first leg, i.e., the left leg 11L is a swing leg and the second leg, i.e., the right leg 11R is a support leg (Operation 402), when the left leg 11L contacts the ground and thus ground reaction force applied to the left leg 11L exceeds a first set value ($f_z[L]>F_s$), the right leg 11R transitions to the toe-off state (Operation 404). Under such a toe-off state, a feed forward torque value is added to control to track a set trajectory. Under this state, when the ground reaction force applied to the right leg 11R is reduced to below a second set value ($f_z[R]<F_t$), the right leg 11R transitions to the swing state and the left leg 11L transitions to the support state (Operation 406). Thereafter, when the right leg 11R contacts the ground and thus ground reaction force applied to the right leg 11R exceeds the first set value ($f_z[R]>F_s$), the left leg 11L transitions to the toe-off state (Operation 408). Under such a toe-off state, the feed forward torque value is also added to control to track a set trajectory. Thereafter, when the ground reaction force applied to the left leg 11L is reduced to below the second set value ($f_z[L]<F_t$), the left leg 11L transitions to the swing state and the right leg 11R transitions to the support state (Operation 402).

Expression 1 below represents torque $\tau_d(t)$ applied in transition to the toe-off state in control of the walking robot in accordance with an embodiment.

$$\tau_d(t)=K'_p(\theta_d(t)-\theta(t))-K'_d\dot{\theta}(t)+\tau_{ff}(t), (i.e.,) K'_d\theta(t) \rightarrow K'_d))  \quad \text{Expression 1}$$

In Expression 1, $K'_p$ and $K'_d$ are gains, and $\tau_{ff}(t)$ is feed forward torque $$(i.e., K'_d\theta \rightarrow K'_d).$$

In transition to the toe-off state, values of $K'_p$ and $K'_d$ are reduced to less than 1~10% of gains in transition to the support state or the swing state so that a joint is moved mainly by the feed forward torque $\tau_{ff}(t)$. Since the values of $K'_p$ and $K'_d$ are small, influence of a given trajectory on movement of the joint is insignificant, and a toe-off motion is achieved by the feed forward torque $\tau_{ff}(t)$. Therefore, a separate toe-off motion trajectory does not have to be calculated and the existing walking trajectory without the toe-off motion may be used.

Figure 5:
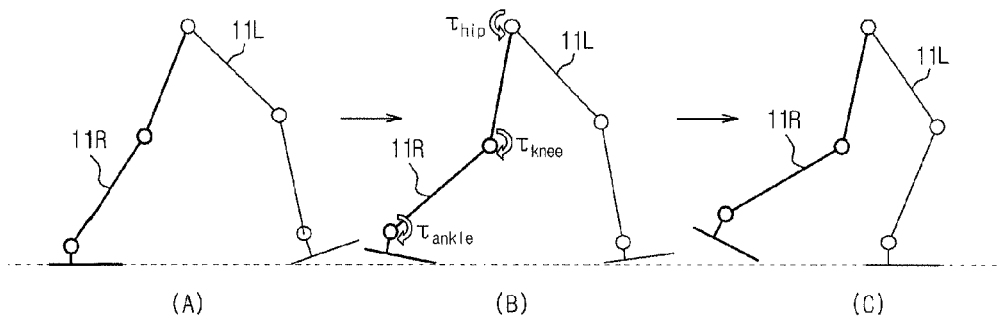
FIGS. 5(A) to 5(C) are views illustrating directions of feed forward torque $\tau_d(t)$ applied to the walking robot in accordance with an embodiment during walking.

FIGS. 5(A) to 5(C) are views illustrating directions of the feed forward torque $\tau_{ff}(t)$ applied to the walking robot in accordance with an embodiment during walking. FIG. 5(A) illustrates a case in which the left leg 11L is in the swing state and the right leg 11R is in the support state, FIG. 5(B) illustrates a case in which the left leg 11L contacts the ground and the right leg 11R is in the toe-off state, and FIG. 5(C) illustrates a case in which the left leg 11L is in the support state and the right leg 11R is in the swing state. In the toe-off state, as shown in FIG. 5(B), feed forward torque $\tau_{hip}$ in the counter-clockwise direction is applied to the hip joint of the right leg 11R in the toe-off state, feed forward torque $\tau_{knee}$ in the clockwise direction is applied to the knee joint of the right leg 11R, and feed forward torque $\tau_{ankle}$ in the clockwise direction is applied to the ankle joint of the right leg 11R.

Here, the feed forward torques applied to the respective joints are obtained through experimentation so as to have values which enable the robot 10 to walk naturally and the obtained values are stored in a database, and in actual walking, the walking robot 10 is controlled so that optimum feed forward torques are applied to the respective joints with reference to the values stored in the database.

As is apparent from the above description, a walking robot and a control method thereof in accordance with an embodiment allow the robot to more stably and naturally walk.

The embodiments can be implemented in computing hardware and/or software, such as (in a non-limiting example) any computer that can store, retrieve, process and/or output data and/or communicate with other computers. For example, sensor unit 304, control unit 302 and/or joint unit 306 in FIG. 3 may include a computer to perform calculations and/or operations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a walking robot, the method comprising:
   performing transition of a second leg of the walking robot to a toe-off state, when ground reaction force applied to a first leg of the walking robot exceeds a first set value under a condition that the first leg is in a swing state and the second leg is in a support state; and
   performing transition of the second leg from the toe-off state to the swing state and transition of the first leg from the swing state to the support state, when ground reaction force applied to the second leg is below a second set value under a condition that the second leg is in the toe-off state,
   wherein torque $\tau_d(t)$ applied in the transition of the second leg of the walking robot to the toe-off state is defined by Expression 1, $$\tau_d(t)=K'_p(\theta_d(t)-\theta(t))-K'_d\dot{\theta}(t)+\tau_{ff}(t), \quad \text{Expression 1}$$

in Expression 1, $K'_p$ and $K'_d\theta$ are gains, and $\tau_{ff}(t)$ is feed forward torque.

2. The control method according to claim 1, further comprising:
   achieving walking of the walking robot by repeating transitions of the first and second legs among the swing state, the support state, and the toe-off state.

3. The control method according to claim 1, wherein the gains $K'_p$ and $K'_d$ are reduced in the transition of the second leg of the walking robot to the toe-off state.

4. The control method according to claim 3, wherein the gains $K'_p$ and $K'_d$ are reduced in the transition of the second leg of the walking robot to the toe-off state to less than 1~10% of gains in the transition of the second leg of the walking robot to the support state or the swing state.

5. The control method according to claim 1, wherein as the feed forward torque applied to the second leg of the walking robot in the toe-off state, the feed forward torque in a counterclockwise direction is applied to a hip joint of the second leg in the toe-off state, and the feed forward torque in a clockwise direction is respectively applied to a knee joint and an ankle joint of the second leg in the toe-off state.

6. A control method of a walking robot, the method comprising:

performing transition of a first leg of the walking robot to a swing state and transition of a second leg of the walking robot to a support state;

performing transition of the second leg from the support state to a toe-off state, when ground reaction force applied to the first leg exceeds a first set value and the first leg is in the swing state;

performing transition of the second leg from the toe-off state to the swing state and transition of the first leg from the swing state to the support state, when ground reaction force applied to the second leg is below a second set value and the second leg is in the toe-off state;

performing transition of the first leg from the support state to the toe-off state, when the ground reaction force applied to the second leg exceeds the first set value and the second leg is in the swing state;

performing transition of the first leg from the toe-off state to the swing state, when the ground reaction force applied to the first leg is below the second set value and the first leg is in the toe-off state; and achieving walking of the walking robot by repeating the transitions of the first and second legs among the support state, the toe-off state, and the swing state, wherein torque $\tau_d(t)$ applied in the transition of the second leg of the walking robot to the toe-off state is defined by Expression 1, $$\tau_d(t)=K'_p(\theta_d(t)-\theta(t))-K'_d\dot{\theta}(t)+\tau_{\!f\!f}(t), \quad \text{Expression 1}$$

in Expression 1, $K'_p$ and $K'_d$ are gains, and $\tau_{\!f\!f}(t)$ is feed forward torque.

7. The control method according to claim 6, wherein the gains $K'_p$ and $K'_d$ are reduced in the transition of the second leg of the walking robot to the toe-off state.

8. The control method according to claim 6, wherein the gains $K'_p$ and $K'_d$ are reduced in the transition of the second leg of the walking robot to the toe-off state to less than 1~10% of gains in the transition of the second leg of the walking robot to the support state or the swing state.

9. The control method according to claim 6, wherein as the feed forward torque applied to a respective leg of the first and second legs in the toe-off state, the feed forward torque in a counterclockwise direction is applied to a hip joint of the respective leg in the toe-off state, and the feed forward torque in a clockwise direction is respectively applied to a knee joint and an ankle joint of the respective leg in the toe-off state.

10. A control method of a walking robot, the method comprising:

performing transition of a second leg of the walking robot in a support state to a toe-off state, when ground reaction force applied to a first leg of the walking robot in a swing state exceeds a first set value; and performing transition of the second leg from the toe-off state to the swing state and transition of the first leg from the swing state to the support state, when ground reaction force applied to the second leg in the toe-off state is below a second set value, wherein torque $\tau_d(t)$ applied in the transition of the second leg of the walking robot to the toe-off state is defined by Expression 1, $$\tau_d(t)=K'_p(\theta_d(t)-\theta(t))-K'_d\dot{\theta}(t)+\tau_{\!f\!f}(t), \quad \text{Expression 1}$$

in Expression 1, $K'_p$ and $K'_d$ are gains, and $\tau_{\!f\!f}(t)$ is feed forward torque.

11. The control method according to claim 10, wherein the gains $K'^p$ and $K'_d$ are reduced in the transition of the second leg of the walking robot to the toe-off state.

12. The control method according to claim 10, wherein the gains $K'^p$ and $K'^l_d$ are reduced in the transition of the second leg of the walking robot to the toe-off state to less than 1~10% of gains in the transition of the second leg of the walking robot to the support state or the swing state.

13. The control method according to claim 10, wherein as the feed forward torque applied to the second leg in the toe-off state, the feed forward torque in a counterclockwise direction is applied to a hip joint of the second leg in the toe-off state, and the feed forward torque in a clockwise direction is respectively applied to a knee joint and an ankle joint of the second leg in the toe-off state.

14. A walking robot, comprising:

a first leg;

a second leg;

a sensor unit configured to detect ground reaction forces respectively applied to the first leg and the second leg; and a control unit configured to perform transition of the second leg in a support state to a toe-off state, when the ground reaction force applied to the first leg in a swing state exceeds a first set value, and configured to perform transition of the second leg from the toe-off state to the swing state and transition of the first leg from the swing state to the support state, when the ground reaction force applied to the second leg in the toe-off state is below a second set value, wherein the control unit is configured to apply torque $\tau_d(t)$ defined by Expression 1 to the second leg in the toe-off state, $$\tau_d(t)=K'_p(\theta_d(t)-\theta(t))-K'_d\dot{\theta}(t)+\tau_{\!f\!f}(t), \quad \text{Expression 1}$$

in Expression 1, $K'_p$ and $K'_d$ are gains, and $\tau_{\!f\!f}(t)$ is feed forward torque.

15. The walking robot according to claim 14, wherein the control unit is configured to reduce the gains $K'_p$ and $K'_d$ in the transition of the second leg of the walking robot to the toe-off state.

16. The walking robot according to claim 14, wherein the control unit is configured to reduce the gains $K'_p$ and $K'_d$ in the transition of the second leg of the walking robot to the toe-off state to less than 1~10% of gains in the transition of the second leg of the walking robot to the support state or the swing state.

17. The walking robot according to claim 14, wherein the control unit is configured to apply the feed forward torque in a counterclockwise direction to a hip joint of the second leg in the toe-off state, and is configured to respectively apply the feed forward torque in a clockwise direction to a knee joint and an ankle joint of the second leg in the toe-off state.

* * * * *